United States Patent
Dolan et al.

(10) Patent No.: US 8,147,588 B2
(45) Date of Patent: Apr. 3, 2012

(54) LOWER REACTIVITY ADSORBENT AND HIGHER OXYGENATE CAPACITY FOR REMOVAL OF OXYGENATES FROM OLEFIN STREAMS

(75) Inventors: William Dolan, Yardley, PA (US); Barry Speronello, Belle Mead, NJ (US); Alfonse Maglio, River Edge, NJ (US); Dennis Reinertsen, Hackettstown, NJ (US); Dana Rehms Mooney, Natchez, MS (US)

(73) Assignee: BASF Corporation, Florham Park, NJ (US)

( * ) Notice: Subject to any disclaimer, the term of this patent is extended or adjusted under 35 U.S.C. 154(b) by 372 days.

(21) Appl. No.: 12/573,927

(22) Filed: Oct. 6, 2009

(65) Prior Publication Data
US 2011/0079145 A1   Apr. 7, 2011

(51) Int. Cl.
*B01J 20/08* (2006.01)
*B01J 20/18* (2006.01)
*C07C 7/13* (2006.01)

(52) U.S. Cl. ............. 95/90; 95/900; 96/153; 502/400

(58) Field of Classification Search .............. 95/90, 135, 95/900, 902; 96/153; 502/64, 71, 74, 400, 502/415, 439; 208/208 R
See application file for complete search history.

(56) References Cited

U.S. PATENT DOCUMENTS

| | | | |
|---|---|---|---|
| 4,686,198 A | 8/1987 | Bush et al. | |
| 4,717,483 A | 1/1988 | Bush et al. | |
| 4,751,211 A | 6/1988 | Fleming | |
| 4,762,537 A | 8/1988 | Fleming et al. | |
| 4,917,711 A | 4/1990 | Xie et al. | |
| 5,220,099 A | 6/1993 | Schreiner et al. | |
| 5,779,767 A * | 7/1998 | Golden et al. | 95/96 |
| 5,990,372 A | 11/1999 | Blankenship et al. | |
| 6,013,600 A | 1/2000 | Kanazirev | |
| 6,413,898 B1 * | 7/2002 | Faber et al. | 502/64 |
| 6,632,766 B2 | 10/2003 | Kanazirev | |
| 2003/0221555 A1 | 12/2003 | Golden et al. | |

* cited by examiner

*Primary Examiner* — Frank Lawrence, Jr.
(74) *Attorney, Agent, or Firm* — Raymond F. Keller

(57) ABSTRACT

An improved adsorbent useful in removing contaminants from various hydrocarbon streams comprises a zeolite, an alumina and an added metal component provided in the adsorbent by initially contacting primarily the zeolite with the added metal. In a specific application, an adsorbent comprising sodium-impregnated zeolite Y and alumina is used to purify an ethylene stream in order to remove $CO_2$, $H_2S$, methanol, and other S- and O-containing compounds.

20 Claims, No Drawings

LOWER REACTIVITY ADSORBENT AND HIGHER OXYGENATE CAPACITY FOR REMOVAL OF OXYGENATES FROM OLEFIN STREAMS

FIELD OF THE INVENTION

This application relates to an adsorbent which comprises a zeolite, an alumina component and an added metal component, e.g. sodium, contained predominately in the zeolite component. This new adsorbent is used to remove contaminants from hydrocarbon streams, e.g. removing $CO_2$, $H_2S$, $AsH_3$, methanol, mercaptans and other S- or O-containing organic compounds from ethylene, propylene, $C_3$-$C_4$ hydrocarbon products and other light hydrocarbon streams.

BACKGROUND OF THE INVENTION

Solid adsorbents are commonly used to remove contaminants from hydrocarbon streams such as olefins, natural gas and light hydrocarbon fractions. Since these streams can contain different contaminants, more than one adsorbent or adsorbent bed are needed to sufficiently purify the stream so that it can be used in the desired process. Contaminants which can be present in these streams include $H_2O$, CO, $O_2$, $CO_2$, COS, $H_2S$, $NH_3$, $AsH_3$, $PH_3$, Hg, methanol, mercaptans and other S- or O-containing organic compounds.

While various adsorbents can remove one or more contaminants, they can also remove and/or promote reactions of the desired hydrocarbon. For example, faujasite type zeolites, e.g. zeolite 13X, are good adsorbents for sulfur and oxygenate compounds. However, they are also good adsorbents for olefins resulting in heat generation that can lead to high temperature rise and/or run-away reactions. Additionally, the zeolite's residual surface reactivity can cause oligomerization and polymerization during regeneration. This leads to fouling and performance deterioration.

In attempts to remedy this problem, there are reports in the art where zeolites have been mixed with alumina. U.S. Pat. No. 4,762,537 discloses the use of an adsorbent comprising zeolite Y and alumina to remove HCl from a hydrogen stream. In U.S. Pat. Nos. 4,686,198 and 4,717,483 it is disclosed that a mixture of alumina and sodium Y zeolite can remove ammonia, sulfides and organic impurities from waste water. The sodium Y zeolite contains at least 12.7 wt. % $Na_2O$. The same adsorbent is also used to reduce the acidity and moisture content of used organophosphate functional fluids, see U.S. Pat. No. 4,751,211. The use of alumina with alkali or alkaline earth metal for removing HCl and other contaminants is disclosed in U.S. Pat. No. 6,013,600.

In U.S. Pat. No. 6,632,766, to UOP, there is described an improved adsorbent which can remove multiple contaminants from various hydrocarbon streams. This adsorbent comprises a zeolite, alumina and a metal component which is present in an amount of at least 10 mole % of the stoichiometric amount of metal (expressed as the oxide) needed to compensate for the negative charge of the zeolite lattice. In this patent, the metal component, in particular, sodium, is added to both the zeolite and alumina components.

In the discovery of the patent immediately above, UOP found that adding Na (broadly Group 1A/2A metals) to a zeolite/alumina composited adsorbent greatly reduces the reactivity of olefins/oxygenates over the adsorbent as evidenced by a reduction of oligermization. However, not shown in the patent is a loss in methanol capacity (a representative oxygenate) on the adsorbent. The present inventors have determined that the highest reduction in reactivity can be attained for a given loss in oxygenate capacity by placing the sodium initially only on the zeolite portion of the adsorbent.

SUMMARY OF THE INVENTION

This invention relates to a solid shaped adsorbent, a process for preparing the adsorbent and a process for removing contaminants using the adsorbent. Accordingly, one embodiment of the invention is a solid shaped adsorbent for purifying hydrocarbon streams comprising an alumina component, a zeolite component and an added metal component selected from, for example, the group consisting of alkali metals, alkaline earth metals and mixtures thereof, the added metal component being initially added primarily to the zeolite component such that the amount of added metal is greater in the zeolite than if the same amount of initial metal was added to a mixture of the zeolite and alumina. The added metal component is present in an amount over the stoichiometric amount of metal needed to compensate for the negative charge of the zeolite lattice.

Another embodiment of the invention is a process for preparing a solid shaped adsorbent for purifying hydrocarbon streams comprising an alumina component, a zeolite component and an added metal component selected from, for example, the group consisting of alkali metals, alkaline earth metals and mixtures thereof and that is initially added primarily to the zeolite component such that the amount of added metal is greater in the zeolite than if the same amount of initial metal was added to a mixture of the zeolite and alumina. The added metal component is present in an amount over the stoichiometric amount of metal needed to compensate for the negative charge of the zeolite lattice.

The process of preparing the adsorbent comprises placing the added metal component on the zeolite and then agglomerating with alumina, and alternatively placing the additional metal component on the zeolite, forming the metal-containing zeolite as a separate bead and then blending separate alumina and zeolite beads to form a particulate mixed bed.

Yet another embodiment of the invention is a process for removing contaminants from hydrocarbon streams comprising contacting the stream with the solid shaped adsorbent or mixed particulate adsorbent described above at adsorption conditions to remove at least a portion of at least one contaminant.

These and other objects and embodiments will become clearer after a detailed description of the invention.

DETAILED DESCRIPTION OF THE INVENTION

The invention comprises a solid shaped adsorbent or particulate adsorbent composition, a process for preparing the adsorbent and purification processes using the adsorbent. With regard to the solid shaped adsorbent, and particulate adsorbent composition, one necessary component is an activated alumina. Activated aluminas include aluminas having a surface area usually greater than 100 $m^2$/g and typically in the range of 100 to 400 $m^2$/g. Further, the activated alumina powder is preferably obtained by rapid dehydration of aluminum hydroxides, e.g., alumina trihydrate of hydrargillite in a stream of hot gasses or solid heat carrier. Dehydration may be accomplished in any suitable apparatus using the stream of hot gases or solid heat carrier. Generally, the time for heating or contacting with the hot gases is a very short period of time, typically from a fraction of a second to 4 or 5 seconds. Normally, the temperature of the gases varies between 400° and 1000° C. The process is commonly referred to as flash calcination and is disclosed, for example in U.S. Pat. No.

2,915,365, incorporated herein by reference. However, other methods of calcination may be employed.

The activated aluminas suitable for use in the present invention have a median particle size in the range of 0.1 to 300 microns, preferably 1 to 100 microns and typically 1 to 20 microns. In certain instances, it may be desirable to use aluminas with a median particle size of 1 to 10 microns. The alumina may be ground to the desired particle size before or after activation. The activated alumina typically has an LOI (loss on ignition) in the range of about 5 to 12% at a temperature of 200° to 1000° C.

One source of activated alumina is gibbsite which is aluminum trihydrate derived from bauxite using the Bayer process. However, alpha alumina monohydrate, pseudoboehmite or other alumina trihydrates may be used if sufficiently calcined. Other sources of alumina may also be utilized including clays and aluminum alkoxides.

Another necessary component of the present invention is a zeolite. Zeolites are crystalline aluminosilicate compositions which are microporous and have a three-dimensional oxide framework formed from corner sharing $AlO_2$ and $SiO_2$ tetrahedra. Zeolites are characterized by having pore openings of uniform dimensions, having a significant ion exchange capacity, and being capable of reversibly desorbing an adsorbate dispersed throughout the internal voids of the crystal without significantly displacing any atoms which make up the permanent zeolite crystal structure. The zeolites which can be used in the present invention are those which have a pore opening of about 5 to about 10 Å.

In general, the zeolites have a composition represented by the empirical formula:

$$M_{2/n}O:Al_2O_3 \, bSiO_2$$

M is a cation having a valence of "n" and "b" has a value of about 2 to about 500. Preferred zeolites are those that have a $SiO_2/Al_2O_3$ ratio of about 2:1 to about 6:1 and/or those having the crystal structure of zeolite X, faujasite, zeolite Y, zeolite A, mordenite, ZSM-5, beta and ferrierite. Especially preferred zeolites are zeolites X, Y and A.

Preparation of these Zeolites is Well Known in the Art and Involves Forming a reaction mixture composed of appropriate sources of the components which is hydrothermally reacted to form the zeolite. Specifically, the synthesis of zeolite Y is described in U.S. Pat. Nos. 3,130,007 and 4,503,023 and that of zeolite X in U.S. Pat. Nos. 2,883,244 and 3,862,900, the disclosures of which are incorporated by reference.

Although the synthesis of zeolites, and zeolites X and Y in particular, are well known, a brief description will be presented here for completeness. Reactive sources of M include the halide and hydroxide compounds of alkali or alkaline earth metals such as sodium chloride, sodium hydroxide, potassium hydroxide, etc. Aluminum sources include but are not limited to boehmite alumina, gamma alumina and soluble aluminates such as sodium aluminate or tetraethylammonium aluminates. Finally, silicon sources include silica, silica hydrosol, silicic acid, etc.

The reactive sources are combined into a reaction mixture which has a composition in terms of mole ratios of the oxides of:

$SiO_2/Al_2O_3$=8 to 12
$M_2O/Al_2O_3$=2.5 to 4
$H_2O/M_2O$=120 to 180 and the mixture is then reacted to form the zeolite.

As synthesized, the zeolites will contain "M" metals in the channels and/or pores. The function of the metal cations is to balance the negative charge of the zeolite lattice. Since these cations are not part of the framework, they are exchangeable and are said to occupy exchange sites. The amount of metal cations present in the zeolite is referred to as the stoichiometric amount or the maximum ion exchange capacity of the zeolite. This amount is usually expressed in moles.

Since the metal cations initially present in the zeolite are exchangeable they can be exchanged for other (different) alkali metals, alkaline earth metals, hydronium ions, ammonium ions or mixtures thereof. If the zeolite to be used contains partially or completely hydronium or ammonium ions, then these ions must be fully exchanged with alkali metals, alkaline earth metals or mixtures thereof, before the preparation of the composite adsorbent.

Another necessary component of the shaped adsorbent of this invention is an added metal component selected from the group consisting of alkali, alkaline earth metals and mixtures thereof. This added metal component is in addition to the metal cation (M) present in the exchange sites of the zeolite. The added metal can be the same or different than the M metal.

Specific examples of added metal include but are not limited to sodium, potassium, lithium, rubidium, cesium, calcium, strontium, magnesium, barium, zinc and copper. The source of the added metal (metal component precursor) can be any compound which at activation conditions, (see infra) decomposes to the metal oxide. Examples of these sources are the nitrates, hydroxides, carboxylates, carbonates and oxides of the metals.

The shaped adsorbent can be prepared by combining the three components in an order which provides an amount of the added metal component in the zeolite in an amount greater than if the same amount of metal was added to a mixture of the zeolite and alumina. Methods of preparation to intentionally contact the alumina with the added metal are preferably avoided such that only the zeolite is treated to contain the metal and, therefore, only the zeolite should contain the added metal during initial processing. However, during the forming process as described below, it is inevitable that some quantity of added metal will migrate to the alumina. The final product, however, will be such that the amount of added metal component in the zeolite is greater than if the same amount of initial metal was contacted with a mixture of zeolite and alumina.

In one method, the zeolite and an aqueous solution of the desired metal compound are mixed to impregnate the zeolite with the added metal. It is useful to improve impregnation of the zeolite by removing moisture. Heating the zeolite at temperatures of about 150° C. for 1 to 2 hours serves this purpose. Either, before or after the metal is converted to oxide, the impregnated zeolite is mixed with alumina and the mixture formed into a shaped article. For example, zeolite Y and a solution of sodium acetate can be combined to impregnate the zeolite. The impregnated zeolite Y and gamma alumina can be combined and formed into a dough and then extruded or formed into shapes such as pellets, pills, tablets or spheres (e.g. by the oil drop method) by means well known in the art. A preferred method of forming substantially rounded shapes or bodies involves the use of a pan nodulizer. This technique uses a rotating pan or pan nodulizer into which is fed the alumina component, the impregnated zeolite component and, optionally, binder thereby forming substantially rounded articles or bodies. Typical binders include sodium silicate, clays, and evaporable liquids, e.g. water, alcohol, used to combine the components for shaping. Alternatively the alumina it self may serve as the binder at certain alumina concentrations, e.g., at least 50 wt. %, typically at least 65 wt. %.

The shaped articles are cured or dried at ambient temperature up to about 200° C. for a time of about 5 minutes to about 25 hours. The shaped articles can be cured in batches e.g. bins or trays, or in a continuous process using a rotating drum or moving belt. Once the shaped articles are cured, they are activated by heating the cured articles at a temperature of about 275° C. to about 600° C. for a time of about 5 to about 600 minutes. The heating can be done with the articles in a rotating drum or in a moving belt where the articles are direct fired to provide the finished solid adsorbent. Activation and conversion of added metal to metal oxide at the mentioned elevated temperature may also be accomplished before the dried zeolite containing the added metal is mixed with the alumina, but is not preferred.

The relative amount of the alumina and impregnated zeolite components can vary considerably over a wide range. Usually the amount of alumina varies from about 40 to about 90%, typically 50-80% by weight. The amount of impregnated zeolite varies from about 10 to about 60 wt. % of the adsorbent. The amount of added metal component, can also vary, but must be present in an amount equal to at least 10% of the stoichiometric amount of the metal cation, M, present in the exchange sites of the zeolite. Inasmuch as it has been found that the added metal should be initially confined to the zeolite to achieve less reactivity and improved absorption of oxygenates such as methanol, less of the added metal needs to be included in the adsorbent as required by the previously mentioned UOP patent. Accordingly, in absolute terms, it is preferred that the amount of added metal be present in amounts from about 0.0075 to about 0.05 moles of added metal per 100 gm of adsorbent. More preferably, the amount of added metal will be from about 0.0075 to 0.0135 moles per 100 gm of adsorbent. The amounts of M and added metal are reported or expressed as the oxide of the metal, e.g. $Na_2O$.

The finished adsorbent can now be used to remove contaminants from various hydrocarbon streams. The streams which can be treated include but are not limited to hydrocarbon streams, especially those containing saturated and/or unsaturated hydrocarbons. Olefin streams such as ethylene, propylene and butylenes can be especially treated using the adsorbent. These streams may contain one or more of the following contaminants: $H_2O, CO, O_2, CO_2, COS, H_2S, NH_3, AsH_3, PH_3$, Hg, methanol, mercaptans and other S- or O-containing organic compounds.

The hydrocarbon streams are purified by contacting the stream with the solid adsorbent at adsorption conditions. The contacting can be carried out in a batch or continuous process with continuous being preferred. The adsorbent can be present as a fixed bed, moving bed or radial flow bed with fixed bed being preferred. When a fixed bed is used, the feed stream can be flowed in an upflow or downflow direction, with upflow being generally preferred for liquid feeds. If a moving bed is used the feed stream flow can be either co-current or counter-current. Further, when a fixed bed is used, multiple beds can be used and can be placed in one or more reactor vessel. Adsorption conditions include a temperature of about ambient to about 80° C., a pressure of about atmospheric to about 100 atm. ($1.01 \times 10^4$ kPa) and a contact time which depends on whether the hydrocarbon stream is a liquid or gaseous stream. For a liquid stream the contact time expressed in terms of liquid hourly space velocity (LHSV) is from about 0.01 to about 10 $hr^{-1}$, while for a gaseous stream, the gas hourly space velocity varies from about 500 to about 10,000 $hr^{-1}$.

After a certain amount of time, which time depends on the concentration of contaminants, the size of the bed and the space velocity, the adsorbent will be substantially spent, i.e. has adsorbed an amount of contaminant(s) such that the level of contaminant in the purified stream is above an acceptable level. At this time, the adsorbent is removed and replaced with fresh adsorbent. The spent adsorbent can be regenerated by means well known in the art and then placed back in service. In a typical regeneration procedure, the adsorbent is first drained and depressurized followed by a cold purge with an inert stream. Next, a warm purge in a downflow direction at 80-150° C. removes the retained hydrocarbons from the bed. Finally, the temperature is slowly raised to 280-320° C. and held there for at least 2 hours and then cooled to ambient temperature.

The following examples are set forth in order to more fully illustrate the invention. It is to be understood that the examples are only by way of illustration and are not intended as an undue limitation on the broad scope of the invention as set forth in the appended claims.

Example 1

Eight sample adsorbents were prepared as follows: samples were prepared by mixing Y zeolite powder with alumina. The zeolite Y and alumina sources were the same for all samples.

Sample 1 was made by adding 188 lbs. of Y-zeolite and 624 lbs. of alumina and mixing in a fluidized bed. After the powders were mixed they were agglomerated, cured and activated through a belt driven activator with zone temperatures of 350° F., 450° F., 600° F., 750° F., and 875° F. with the material residing in each zone for approximately the same period of time. Total residence time on the belt was 2.5 hours.

Sample 2 was a ⅛ inch bead formed from alumina powder only. The powder was pan agglomerated, cured and activated through a belt driven activator with zone temperatures of 350° F., 450° F., 650° F., 750° F., and 775° F. with the material residing in each zone for approximately the same period of time. Total residence time on the belt was 2.5 hours.

Sample 3 was made by mixing 2.25 grams of Y-zeolite with 7.75 grams of alumina. 6 grams of aqueous NaOH at a concentration of 9% was added to the combined powders to achieve a 4% $Na_2O$ level on the combined mixture. After the powders were mixed and impregnated, the material was prepared with a Carver press to form a large pellet, the resulting pellet broken into pieces and sieved to a 10×12 mesh. Once sieved, the material was calcined in an oven at 320° C. for 2 hours.

Sample 4 was made by adding 21.75 grams of sodium acetate as an aqueous solution (22.8 wt % $CH_3COONa$) to 63 grams of Y zeolite. The impregnated zeolite was added to 216 grams of alumina. After the powders were mixed, the materials were pan agglomerated. Once agglomerated, the material was aged at 180° F. for 4 hours, screened to 10×12 mesh, and calcined in an oven at 150° C. for 1 hour followed by 420° C. for 1 hr.

Sample 5 was made by combining 188 lb of Y-zeolite and 624 lb of alumina and mixing in a fluidized bed. After the powders were mixed they were agglomerated and then activated through a belt driven activator with zone temperatures of 350° F., 450° F., 600° F., 750° F., and 875° F. with the material residing in each zone for approximately the same period of time. Total residence time on the belt was 2.5 hours.

Sample 6 was prepared in a V-blender: 331 Kg of Y-zeolite was added first. While rotating for a period of 5 minutes, 72.2 kg of 23.74% Na Acetate was sprayed into the zeolite. After the material was discharged from the vessel the impregnated zeolite material was sampled. Next, 59.6 g impregnated zeoite with a moisture content of 27.8% was mixed with 150.8 g of alumina in a lab scale (0.7 ft3) V-blender for a period of 30 minutes. After the powders were mixed they were pan agglomerated. Once agglomerated, the materials were aged at 180° F. for 4 hours. The materials were then screened to 10×12 mesh, and calcined in an oven at 150° C. for 1 hour followed by 420° C. for 1 hr.

Sample 7 was prepared by combining 239 grams of Y-zeolite and 761 grams of Alumina in an Eirch mixer for 1 minute. After 1 minute, an aqueous solution of 7 wt % $CH_3COONa$ was sprayed into the rotating Eirich mixer. In total, 208.5 grams of solution was sprayed into the mixture of alumina and Y zeolite over a period of 3 minutes. After the impregnation, the mixture was pan agglomerated. Once agglomerated the particles were aged at 180° F. for 4 hours. The materials were then screened to 10×12 mesh, and calcined in an oven at 150° C. for 1 hour followed by 420° C. for 1 hr.

Sample 8 was prepared by impregnating 700 grams of Y-zeolite (dry basis) at a moisture level of 15%, with 159 grams of an aqueous solution of 23% $CH_3COONa$ over a period of 3 minutes. After that period, 1300 grams of alumina (dry basis) at a moisture level of 6% was added and mixed in an Eirch mixer for 3 minutes. After the powders were mixed they were pan agglomerated. Once agglomerated, the materials were aged at 180° F. for 4 hours. The materials were then screened to 10×12 mesh, and calcined in an oven at 150° C. for 1 hour followed by 420° C. for 1 hr.

Example 2

The level of reactivity of Samples 1, 2 and 4 from Example 1 was measured by analysis of residual carbon on the adsorbent after the rapid deactivation test as described in Example 4 below.

The results are shown in Table 1.

TABLE 1

|  | 1 zeolite Y/alumina | 2 alumina | 4 zeolite Y/alumina |
|---|---|---|---|
| C % | 3.6 | 1.45 | 2.19 |

As can be seen above, adding sodium, Sample 4, reduced the level of reactivity relative to Sample 1, evidenced by the reduced levels of coke formation. Importantly, Sample 2 using pure alumina with no sodium impregnation had the least coke formation showing that the alumina does not play a significant part in this reactivity. Thus, treating only the zeolite with sodium, reduces reactivity and maintains the adsorptive strength of the alumina.

Carbon is measured using a LECO® CHN-2000 Carbon, Hydrogen and Nitrogen Analyzer, a non-dispersive, infrared (IR), microcomputer-based instrument designed to measure the carbon, hydrogen, and nitrogen content in a wide variety of compounds.

Analysis begins by weighing a sample and placing it into the sample holder. The sample is transferred to a combustion chamber where the temperature of the furnace (approximately 900° C.) and flow of oxygen gas, cause the sample to combust. The process converts any elemental carbon, hydrogen, and nitrogen into $CO_2$, $H_2O$, $N_2$, and $NO_x$. These gases are then passed through IR cells to determine carbon and hydrogen content and a thermal conductivity (TC) cell to determine nitrogen content.

Example 3

30 grams per minute of 85% n-butane, 15% butene-1 with 1000 ppm (molar basis) of methanol was flowed through a bed containing 2 grams of adsorbent. The bed had dimensions of 0.5" ID by 3" length. Glass beads were placed in the first 1 inch of the bed, followed by glass wool, then adsorbent, and then more glass beads were used to fill the bed to the top. The feed was passed through the bed for a period of 30 minutes. After that period of time the feed was stopped and the outlet of the adsorbent bed closed. The bed was opened to a collection tank which was connected to a dry test meter (DTM). The liquids were then flashed off through the DTM to atmospheric pressure and the total quantity was measured by the DTM.

After the liquids were flashed to atmospheric pressure, the bed was closed off from the collection tank. The collection tank was then evacuated with vacuum, and the adsorbent bed was again opened to the collection tank. The collection tank was pressurized with helium to 1000-2000 torr. The collection tank mixture was then analyzed with a gas chromatograph (GC). Next, the adsorbent bed was heated to a temperature of 270° C. degrees with cable heaters, and once the bed was at temperature, the collection tank was again evacuated. The following procedure was then followed:

1) The adsorbent bed was opened to the collection tank for 60 seconds.
2) The collection tank was pressurized to 1000-2000 torr with helium.
3) The collection tank mixture was analyzed by GC.
4) The collection tank was evacuated again.

The procedure outlined in steps 1 through 4 above was repeated until the pressure of adsorbent bed measured below 5 torr.

The total amount (moles) of desorbed material can be calculated by noting each pressure and temperature of the collection tank with fixed volume. This sum along with compositions measured by the GC enables determination of the total moles of each desorbed species. Knowing the total moles desorbed for each species and the grams of adsorbent, it is possible to calculate the amount of material retained after flashing to the DTM. We report the moles desorbed not including the liquid flashed off through the DTM. We have further assumed that the quantity of material left on the adsorbent is negligible at 270° C. and 5 torr.

The collection tank volume was 300 $cm^3$. Desorbed methanol (MeOH) is observed as three species in the GC: dimethyl ether (DME), MeOH and water. Water is not measured but assumed to be present. By stochiometry, every mole of DME measured indicates that 2 moles of methanol adsorbed. Reported values for the amount of methanol adsorbed represent the amount remaining after the liquids are flashed to atmosphere through the DTM.

Example 4

In rapid deactivation tests, the adsorption step was allowed to occur for 10 minutes. Then the contents of the adsorbent bed were flashed to atmosphere and the flow directed to the DTM for 10 minutes. Once flashed to atmospheric pressure, the adsorbent bed was brought to 270° C. for 20 minutes with cable heaters. The cable heaters were then turned off, and vacuum was pulled for 10 minutes from the collection tank. The preceding sequence of steps represents one cycle. Multiple cycles (80 or 180) were completed to simulate aging of the adsorbent bed.

Table 2 provides the results of adsorbent capacity of fresh materials from the procedure of Example 3, and aged materials from the procedure directly above. As can be seen, Sample 1 had the highest fresh capacity and Sample 4 had the next highest fresh capacity. However, Sample 4 had a better capacity after aging than Sample 1, a commercial adsorbent.

Further, Sample 4 where Y-zeolite was impregnated with the sodium before mixing with alumina showed a higher fresh capacity than Sample 3.

TABLE 2

Feed methanol 1000 ppm

| Sample | Sample 1 | Sample 2 | Sample 3 | Sample 4 |
|---|---|---|---|---|
| Fresh MeOH Capcity (g/100 g adsorbent) | 6 | 2.2 | 3.9 | 4.5 |
| MeOH Aged 180 Cycles (g/100 g adsorbent) | 2.9 | | | 3.1 |

Example 5

Table 3 provides more results of adsorbent capacity of fresh materials and aged materials. Samples 5 and 8 had the highest fresh MeOH capacity and sample 7 had the lowest fresh MeOH capacity. Samples 6 and 7 had the same Y content, however, Sample 7 had a lower fresh MeOH capacity and greater loss in MeOH capacity with time, indicating the advantage of contacting the sodium initially with only the zeolite. To match the higher fresh MeOH capacity of the Sample 5, Sample 8 was prepared with a higher concentration of Y-zeolite. In this case, the MeOH capacity of sample 5 decayed, but the MeOH capacity of Sample 8 remained high.

TABLE 3

500 ppm MeOH feed

| Sample | Sample 5 | Sample 6 | Sample 7 | Sample 8 |
|---|---|---|---|---|
| Fresh MeOH Capcity (g/100 g adsorbent) | 4.76% | 3.67% | 3.39% | 4.80% |
| MeOH Aged 80 Cycles (g/100 g adsorbent) | 3.4% | 3.24% | 2.53% | 4.6% |
| Loss in Fresh Capacity | 40% | 13.3% | 34% | 4.3% |

What is claimed:

1. A solid adsorbent for purifying hydrocarbon streams comprising an alumina component, a zeolite component and a added metal component, the added metal component being present in an amount of from about 0.0075 to 0.0135 moles of the metal as the oxide per 100 g of adsorbent and where the alumina is present in an amount from about 40 to about 90 wt. % of the adsorbent.

2. The adsorbent of claim 1 where the zeolite is selected from the group consisting of zeolite X, zeolite Y, zeolite A, ZSM-5, zeolite beta and mixtures thereof.

3. The adsorbent of claim 1 where the added metal component is an alkali metal selected from the group consisting of sodium, potassium, lithium, rubidium, cesium and mixtures thereof.

4. The adsorbent of claim 3 wherein the added metal component is sodium.

5. The adsorbent of claim 1 wherein the added metal component is initially added primarily to the zeolite such that the added metal is present in the zeolite component in amounts greater than if the same amount of initial metal was added to a mixture of the zeolite and alumina.

6. The adsorbent of claim 5 in the form of a solid shape comprising a mixture of zeolite and alumina particles.

7. A solid adsorbent for purifying hydrocarbon streams comprising an alumina component, a zeolite component and an added metal component, the added metal component being initially added primarily to the zeolite such that the added metal is present in the zeolite component in amounts greater than if the same amount of initial metal was added to a mixture of the zeolite and the alumina.

8. The adsorbent of claim 7 where the zeolite is selected from the group consisting of zeolite X, zeolite Y, zeolite A, ZSM-5, zeolite beta and mixtures thereof.

9. The adsorbent of claim 8 where the zeolite is zeolite Y.

10. The adsorbent of claim 7 where the added metal component is an alkali metal selected from the group consisting of sodium, potassium, lithium, rubidium, cesium and mixtures thereof.

11. The adsorbent of claim 10 where the metal component is sodium.

12. The adsorbent of claim 7 wherein the added metal component is present in an amount of from about 0.0075 to 0.05 moles of the metal as the oxide per 100 g of adsorbent.

13. A process for preparing a solid adsorbent for purifying hydrocarbon streams comprising an alumina component, a zeolite component and an added metal component where the alumina is present in an amount from about 40 to about 90 wt. % of the adsorbent; the process comprising combining a zeolite component with an added metal component precursor to form an impregnated zeolite, combining the impregnated zeolite and alumina to form a shaped article and activating the article at activation conditions to give the solid adsorbent.

14. The process of claim 13 where the zeolite component is selected from the group consisting of zeolite X, zeolite Y, zeolite A, ZSM-5, zeolite beta and mixtures thereof.

15. The process of claim 13 where the added metal component precursor is selected from a carboxylate, carbonate, aluminate and hydroxide compound of the metal component.

16. The process of claim 13 where the added metal component is an alkali metal.

17. The process of claim 13 comprising curing said shaped article prior to activation, wherein said curing takes place at a temperature of about ambient to about 200° C. and a time of about 5 minutes to about 25 hours.

18. The process of claim 13 where the activation conditions include a temperature of about 275° C. to about 600° C. and a time of about 5 to about 70 minutes.

19. A method of removing contaminants from a hydrocarbon stream comprising contacting the hydrocarbon stream with the adsorbent of claim 1.

20. A method of removing contaminants from a hydrocarbon stream comprising contacting the hydrocarbon stream with the adsorbent of claim 7.

* * * * *